Dec. 29, 1931.   L. THIRY   1,838,794
UNIVERSAL JOINT
Filed June 20, 1929   2 Sheets-Sheet 1
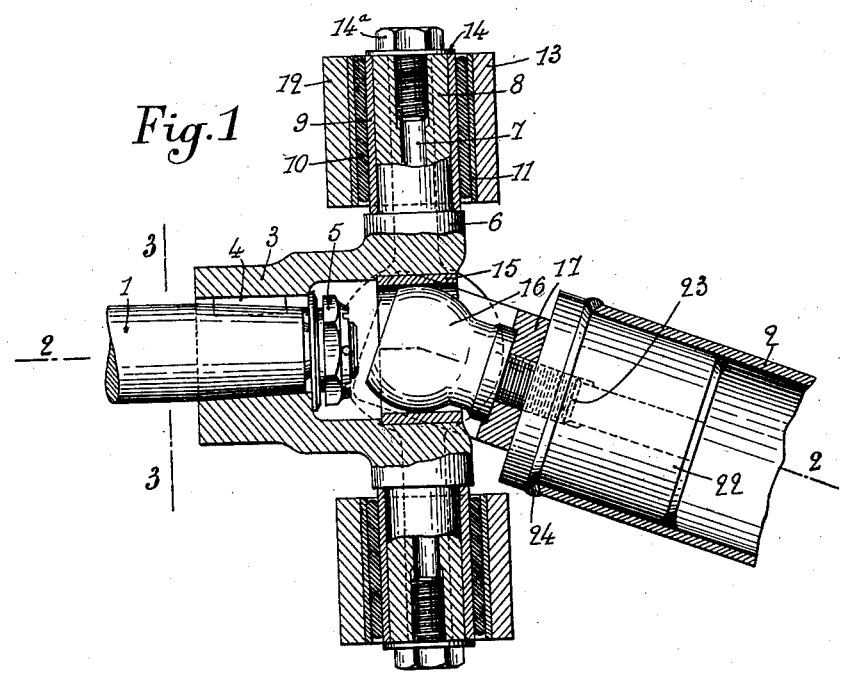
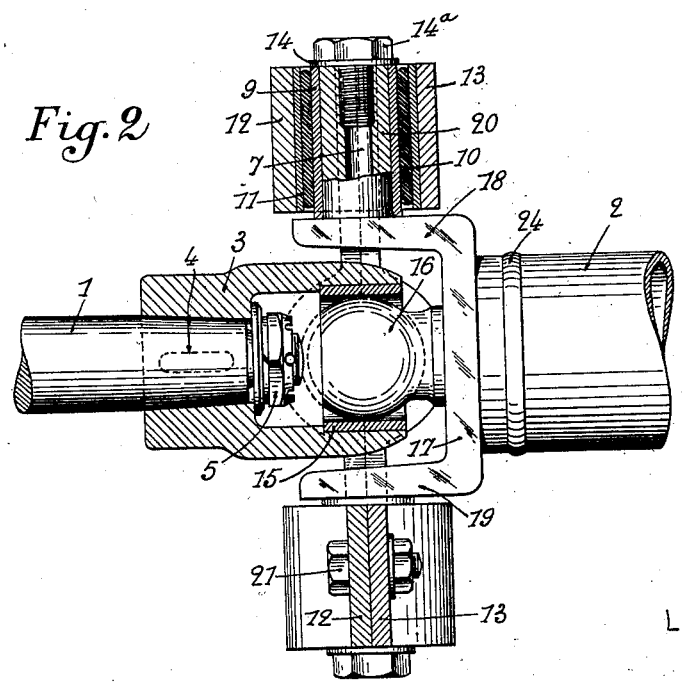
Léon Thiry
INVENTOR;
his Attorney.

Dec. 29, 1931.   L. THIRY   1,838,794
UNIVERSAL JOINT
Filed June 20, 1929   2 Sheets-Sheet  2

Léon Thiry
INVENTOR;
By
his Attorney.

Patented Dec. 29, 1931

1,838,794

UNITED STATES PATENT OFFICE

LEON THIRY, OF HUY, BELGIUM

UNIVERSAL JOINT

Application filed June 20, 1929, Serial No. 372,356, and in France June 30, 1928.

The present invention relates to improvements in universal joints of the type comprising two spindles disposed at right angles and it has for its object to provide a universal joint of simple and inexpensive construction, in which all wear of the bearings is obviated and no lubrication is required, while at the same time assuring a great smoothness in the power transmission.

For this purpose, and according to the invention, the bearings of the right angular spindles respectively comprise a ring of india rubber or other elastic substance which has been considerably stretched in the axial direction by a radial compression.

Further characteristics of the invention will be specified in the following description, with reference to the accompanying drawings, in which:

Fig. 1 is a lengthwise section of a universal joint according to the invention.

Fig. 2 is a cross-section on the line 2—2 of Fig. 1.

Figure 3:
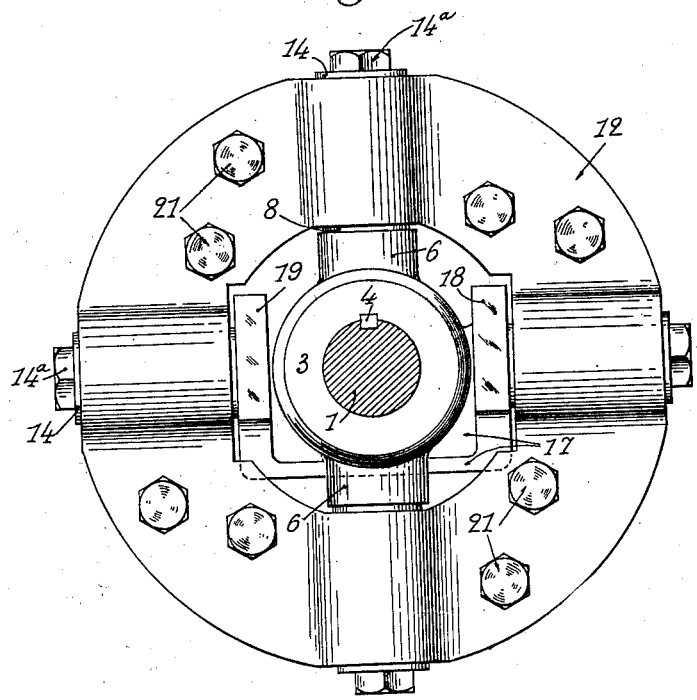
Fig. 3 is an elevational view on the line 3—3 of Fig. 1.

Referring to the drawings, 1 is a driving shaft, for instance the shaft of the change-speed box of a motor vehicle, and 2 is a power transmission shaft connecting the engine to the rear axle of the vehicle. To the tapered end of shaft 1 is keyed, by a suitable key 4, a sleeve 3 which is held in place by a nut 5 and washers. The said sleeve 3 is formed with diametrically opposite bosses 6 and integral with said bosses are aligned pins 8. Upon each pin 8 is fitted a bearing which consists of two coaxial sleeves 9—11 having between them a ring 10 of india-rubber or other elastic substance which has been greatly stretched in the axial direction by radial compression, thus producing a considerable pressure of the india-rubber upon the two sleeves, whereby the requisite adhesion is afforded.

In the cylindrical bore of sleeve 3 is fitted a ring 15 of tempered steel, in which is engaged a ball 16, secured to driven shaft 2. As shown in the drawings, said ball has a threaded shank which is screwed into a cylindrical block 22, fitted into the tubular shaft 2 and secured thereto in any suitable manner, for instance by brazing at 24. Ball 16 is further adapted to clamp against block 22 a fork, whose branches 18—19 are respectively formed with pins 20, similar to pins 8. Upon said pins 20 are fitted respective bearings, provided with strongly compressed india-rubber rings 10, identical with the bearings above specified.

When the parts are assembled, pins 8 and 20 are in the same radial plane and the sleeves 11 of the different bearings are clamped between two plates or cheeks 12—13, which are suitably pressed or stamped into shape in order to fit upon the periphery of the sleeves 11 and are held together by bolts 21. To prevent slipping of the inner sleeve 9, the latter is held by a washer 14 which is pressed against said sleeve by a screw 14ª screwed into holes 7 of pins 8 and 20, respectively.

In this construction, ball 16, which cooperates with ring 15, assures the mutual centering of the two shafts and causes the plane of pins 8 and 20 to constantly pass through the point of intersection of the axes of shafts 1 and 2.

Due to the india-rubber rings 10, which are greatly compressed and strongly adhere to the metallic parts the rotation of the outer sleeves 11 may be considerable by reason of the great shortening of the radial fibres of the india-rubber produced by the radial compression and axial stretching, and said rotation only causes a molecular deformation of the rubber, without any friction. The wear is thus entirely obviated, and no lubrication is required.

The interposition of the india-rubber affords a very smooth action, and the very slight compressibility (which should be small enough to prevent all damage to the india-rubber due to abrupt shocks at starting) of the said india-rubber rings in the radial direction will obviate abrupt shocks at starting.

Furthermore, due to the great initial deformation of the india-rubber, the thickness of the india-rubber, which must be sufficient to obtain a considerable angle of oscillation, may however be quite small, thus preventing any excessive looseness or slack in the power transmission.

Obviously, the invention is not limited to the construction herein described, which is given solely by way of example.

Having now described my invention what I claim as new and desire to secure by Letters Patent is:

1. In a universal joint comprising two relatively positioned U-shaped members having pairs of aligned pivotal joints at right angles to each other, a number of rings of elastic material highly compressed in the radial direction and very greatly stretched in the axial direction between the parts of said pivotal joints, respectively.

2. In a universal joint comprising two relatively positioned U-shaped members having pairs of aligned pivotal joints at right angles to each other, a number of units comprising an inner sleeve, an outer sleeve, and a ring of elastic material highly compressed in the radial direction and very greatly stretched in the axial direction between said sleeves, the inner sleeve thereof being rigidly connected to the arms of said members, respectively.

3. A universal joint comprising a driving member having a pair of aligned pins, a driven member having a pair of aligned pins at right angles to said first mentioned pins, a connecting member having parts completely surrounding said pins, respectively, and a number of rings of elastic material highly compressed in the radial direction and very greatly stretched in the axial direction between said pins and said parts of said connecting member, respectively.

4. A universal joint as claimed in claim 3, which further comprises a ring of hard metal at the centre of one of said members and a ball-shaped projection at the centre of the other member, and fitting within said ring.

5. A universal joint comprising a driving member having a pair of aligned pins, a driven member having a pair of aligned pins at right angles to said first mentioned pins, a number of units comprising an inner sleeve, an outer sleeve, and a ring of elastic material highly compressed in the radial direction and very greatly stretched in the axial direction between said sleeves, means for rigidly connecting said inner sleeves with said pins, respectively, and means for rigidly connecting said outer sleeves with each other.

6. A universal joint comprising a driving member having a pair of aligned pins, a driven member having a pair of aligned pins at right angles to said first mentioned pins, a number of units comprising an inner sleeve, an outer sleeve, and a ring of elastic material highly compressed in the radial direction and very greatly stretched in the axial direction between said sleeves, each pin having a shoulder, said inner sleeves being shifted on said pins, respectively, washers engaging the outer edges of said inner sleeves, respectively, screws threaded in radial bores of said pins for clamping said inner sleeves between said shoulders and said washers, respectively, and means for rigidly connecting said outer sleeves with each other.

7. A universal joint as claimed in claim 5, wherein said latter means comprise two annular plates having complementary hemispherical depressions adapted to receive said outer sleeves and means for pressing said plates toward each other and clamping said outer sleeves in said recesses.

In testimony whereof I have signed my name to this specification.

LEON THIRY.